United States Patent [19]

Mischenko et al.

[11] 4,323,708

[45] Apr. 6, 1982

[54] METHOD FOR PREPARING 2,4-DIAMINOLPHENOL OR 2,4-DIAMONOPHENOL DIHYDROCHLORIDE

[76] Inventors: Alexandr P. Mischenko, Teply Stan, 2 mikroraion, korpus 27, kv. 426; Vladimir M. Gryaznov, Lomonosovsky prospekt, 14, kv. 504, both of Moscow; Igor G. Gakh, ulitsa Shevchenko, 21, kv. 58, Shostka; Iraida L. Parbuzina, Metrostroevskaya ulitsa, 3/14, kv. 44, Moscow; Evgeny M. Savitsky, ulitsa Ulyanova, DNR-3, kv. 13, Moscow; Viktoria P. Polyakova, ulitsa Trofimova, 15, kv. 211, Moscow; Natalia R. Roshan, Yaroslavskoe shosse, 57, kv. 36, Moscow, all of U.S.S.R.

[21] Appl. No.: 140,311

[22] Filed: Apr. 14, 1980

[51] Int. Cl.³ .................. C07C 89/00; C07C 85/11
[52] U.S. Cl. .................... 564/418; 252/472; 564/420; 564/422; 564/423
[58] Field of Search .............. 564/423, 422, 418, 420; 252/472

[56] References Cited

U.S. PATENT DOCUMENTS 4,179,470  12/1979  Mischenko et al. ............... 564/423

*Primary Examiner*—John Doll
*Attorney, Agent, or Firm*—McAulay, Fields, Fisher, Goldstein & Nissen

[57] ABSTRACT

A method for preparing 2,4-diaminophenol or 2,4-diaminophenol dihydrochloride comprising hydrogenation of 2,4-dinitrophenol on a membrane catalyst made of an alloy consisting of 90 to 98% by mass of palladium, 2 to 10% by mass of rhodium or ruthenium. Said hydrogenation of 2,4-dinitrophenol is effected by hydrogen diffusing through said membrane catalyst. The starting 2,4-dinitrophenol is used in a medium of water or a 4—37% aqueous solution of hydrochloric acid at a concentration of 2,4-dinitrophenol in said medium ranging from 2 to 50% by mass. The hydrogenation is effected at a temperature within the range of from 50° to 150° C. under a pressure of from 1 to 60 atm. The process is simple and performed on a simple equipment; it makes use of both pure and commercial hydrogen, enables elimination of the formation of waste waters and results in the desired products in a high yield: 2,4-diaminophenol—with a yield of up to 93%, 2,4-diaminophenol dihydrochloride—with a yield of up to 92% as calculated for the starting 2,4-dinitrophenol.

1 Claim, No Drawings

METHOD FOR PREPARING 2,4-DIAMINOLPHENOL OR 2,4-DIAMONOPHENOL DIHYDROCHLORIDE

FIELD OF THE INVENTION

The present invention relates to the synthesis of aromatic amines and hydrochlorides thereof and, more specifically, to methods for preparing 2,4-diaminophenol or 2,4-diaminophenol dihydrochloride. This 2,4-diaminophenol is useful in the production of herbicides, fungicides, dyestuffs; 2,4-diaminophenol dihydrochloride is useful in photography as a developing agent.

BACKGROUND OF THE INVENTION

Known in the art is a method for preparing 2,4-diaminophenol by treating 2,4-diaminophenol sulphate with an alkali (cf. Kirk-Othmer Encyclopedia of Chemical Technology, v.2, Interscience Publishers, New York, 1963). In turn, 2,4-diaminophenol sulphate is prepared by electrolytically reducing 1,3-dinitrobenzene (cf. German Pat. No. 75,260) and 3-nitroaniline (cf. German Pat. No. 78,829).

2,4-Diaminophenol sulphate is produced from 1,3-dinitrobenzene upon reduction on a copper cathode or a monel-metal cathode in sulphuric acid in the presence of bivalent tin sulphate or tetravalent germanium sulphate at a temperature of from 90° to 95° C. (cf. Day, Udupa, J. Scient, Ind. Res., India, 6B, 83-92, 1947). Instead of bivalent tin sulphate or tetravalent germanium sulphate in the electrolytical reduction use can be made of bivalent iron sulphate (Kirchgof, Chim. farm. Promysl, 1933, 326, 329). In a similar manner it is possible to produce 2,4-diaminophenol sulphate through electrochemical reduction of 2,4-dinitrophenol (Dey, Maller, Pai, J. Scient., Ind. Res., India, 7B, 71, 74, 1948) in sulphuric acid at the temperature of 90° C.

The electrolytical reduction of 2,4-dinitrophenol occurs according to the following scheme:

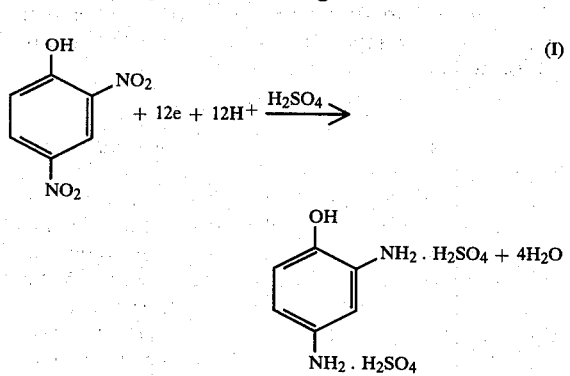

In prior art methods of electrolytical reduction 2,4-diaminophenol sulphate is obtained in a low yield equal to 48-55% of the theoretical value. Furthermore, separation of the desired product from the resulting by-products is associated with considerable technical difficulties.

Therefore, the absence of an efficient method for the preparation of 2,4-diaminophenol sulphate makes it now inexpedient to commercially use it as the starting material for the production of 2,4-diaminophenol. The yield of 2,4-diaminophenol by the process comprising treating 2,4-diaminophenol sulphate with an alkali is 44 to 50% based on the initial 2,4-dinitrophenol.

For the same reasons, it is economically inexpedient to produce 2,4-diaminophenol dihydrochloride by the process based on the use of the same 2,4-diaminophenol sulphate as the starting material. The process comprises treating 2,4-diaminophenol sulphate with calcium chloride, followed by precipitation of the resulting 2,4-diaminophenol dihydrochloride by means of hydrochloric acid.

2,4-Diaminophenol dihydrochloride can be also produced by treating 2,4-diaminophenol with hydrochloric acid (Kirk-Othmer Encyclopedia of Chemical Technology, v.2, Interscience Publishers, New York, 1963) produced by the above-described method. The recovery and purification of 2,4-diaminophenol dihydrochloride cause additional losses of the desired product and a reduced yield thereof (to 42-48% based on the starting 2,4-dinitrophenol).

Known in the art is a process for producing 2,4-diaminophenol dihydrochloride by reducing 2,4-dinitrophenol in a hydrochloric-acid medium by means of hydrogen evolving upon the effect of hydrochloric acid on iron shavings. In this process the reduction of 2,4-dinitrophenol is conducted at a temperature within the range of from 50° to 70° C. in a medium of a 20-30% hydrochloric acid in the presence of iron shavings (cf. German Pat. No. 269542; J. Schwyzer, "Die Fabrication pharmazeutischer und chemisch-technischer Produkte", Berlin, 1931, s. 195). To prevent oxidation of the resulting 2,4-diaminophenol dihydrochloride there is added an aqueous solution of tin dichloride. On completion of the reaction the resulting commercial product is precipitated by the addition of hydrochloric acid and filtered-off. The yield of the commercial product is 55.8% as calculated for the starting 2,4-dinitrophenol. From 40 g of the commercial product there are isolated, by purification with active coal and precipitation with hydrochloric acid, 22 g of pure 2,4-diaminophenol dihydrochloride.

This prior art method has a disadvantage residing in high losses of the product thus causing a low yield of 2,4-diaminophenol dihydrochloride (27-30% based on the starting 2,4-dinitrophenol). Furthermore, a large amount of waste waters containing harmful products are formed in the process.

It is possible to produce 2,4-diaminophenol) from 2,4-diaminophenol dihydrochloride prepared by the above-described method by treating the dihydrochloride with an alkali.

However, in this case the yield of 2,4-diaminophenol is not more than 30% based on the starting 2,4-dinitrophenol which is below its yield (44-50%) in the earlier described prior art process comprising treatment of 2,4-diaminophenol sulphate with an alkali.

BRIEF SUMMARY OF THE INVENTION

It is an object of the present invention to provide such a method for preparing 2,4-diaminophenol or 2,4-diaminophenol dihydrochloride which would make it possible to obtain the final products in a high yield.

It is an object of the present invention to provide such a method which would be simple and contemplate the use of standard equipment.

It is still another object of the present invention to provide such as method for preparing 2,4-diaminophenol or 2,4-diaminophenol dihydrochloride which would make it possible to eliminate the formation of waste waters.

These and other objects of the present invention are accomplished by a process for producing 2,4-diaminophenol or 2,4-diaminophenol dihydrochloride comprising hydrogenation of 2,4-dinitrophenol on a membrane catalyst made of an alloy consisting of 90–98% by mass of palladium and 2–10% by mass of rhodium or ruthenium by means of hydrogen diffusing through the membrane catalyst; the starting 2,4-dinitrophenol is used in the medium of water or a 4–37% aqueous solution of hydrochloric acid at a concentration of 2,4-dinitrophenol in this medium equal to 2–50% by mass; the process is carried out at a temperature within the range of from 50° to 150° C. under a pressure of from 1 to 60 atm.

It should be noted that in the case of using water as the reaction medium in the process according to the present invention the resulting product comprises 2,4-diaminophenol, while in the case of use of a 4–37% aqueous solution of hydrochloric acid as the reaction medium the resulting product comprises 2,4-diaminophenol dihydrochloride.

The process according to the present invention is simple as regards both its technology and the equipment employed. The use of a membrane catalyst makes it possible to use for hydrogenation both pure and commercial hydrogen; it also enables elimination of sour waste waters. The process according to the present invention ensures a high yield of the desired products. Thus, 2,4-diaminophenol is obtained in a yield of up to 93% based on the starting 2,4-dinitrophenol, while 2,4-diaminophenol dihydrochloride is obtained in a yield of up to 92% based on the starting 2,4-dinitrophenol; the hydrogenation process selectivity is approaching 100%.

DETAILED DESCRIPTION OF THE INVENTION

The method for preparing 2,4-diaminophenol or 2,4-diaminophenol dihydrochloride according to the present invention is performed in the following manner.

During hydrogenation use may be made of a membrane catalyst made as a coiled thin-wall tube. In this case the process is carried out in a reactor with its cover having this thin-wall helical tube soldered-in. A solution or a suspension of 2,4-dinitrophenol in an appropriate medium; water or a 4–37% aqueous solution of hydrochloric acid is added to the reactor at a concentration of 2,4-dinitrophenol in said medium of from 2 to 50% by mass. Then the reactor is covered with the lid; in doing so the tube of the membrane catalyst is immersed into the solution or suspension of 2,4-dinitrophenol. Under the selected pressures and rates into the tube of the membrane catalyst pure or commercial hydrogen (e.g. a mixture of hydrogen with nitrogen) is continuously fed. The reactor is heated to the reaction temperature (which is varied within the range of from 50° to 150° C.) and then hydrogenation is effected. Afterwards, the resulting product is isolated by conventional methods such as filtration or precipitation.

It is also possible to use, in the hydrogenation process, of a membrane catalyst made as foil. In this case inside the reactor a chamber is located which is made of foil. Into the chamber hydrogen is continuously passed through tubings, while outside the chamber in the reactor there is a solution or a suspension of 2,4-dinitrophenol. The hydrogenation process is carried out in a similar manner as described for the reactor with a tube-shaped membrane catalyst.

Other embodiments of a membrane catalyst are also possible. For example, it can be made as a sheet of foil partitioning the reactor into two compartments. Into one compartment a solution or a suspension of 2,4-dinitrophenol is continuously added, while into the other compartment hydrogen is continuously admitted.

When the process of hydrogenation is conducted in water, the following reaction occurs with the formation of 2,4-diaminophenol:

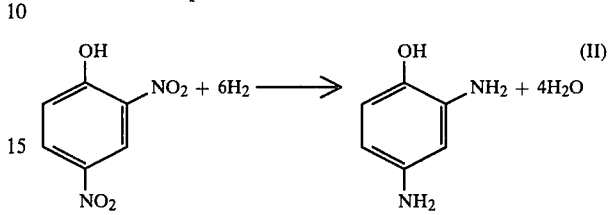

In an aqueous solution of hydrochloric acid 2,4-diaminophenol dihydrochloride is formed according to the following reaction:

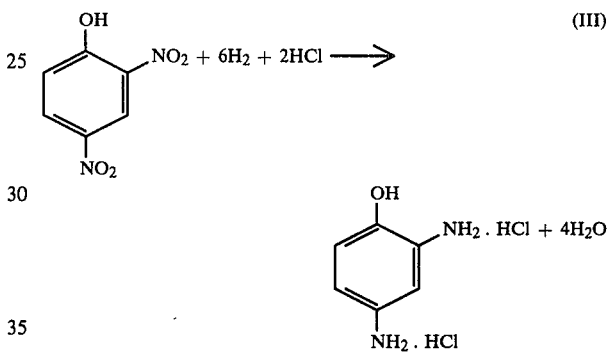

It should be noted that the amount of hydrochloric acid employed for the process should be equal to the stoichiometric value or slightly above it.

For a better understanding of the present invention some following examples are given hereinbelow by way of illustration.

EXAMPLE 1

Onto the bottom of a cylindrical reactor a chamber is placed which is made of a 100μ-thick foil having the working surface area of 50 cm². The foil is manufactured of an alloy consisting of 95% by mass of palladium and 5% by mass of rhodium. Hydrogen is continuously fed inside the chamber under the pressure 2.5 atm at the rate of 10 ml/min. Outside the chamber in the reactor there are placed 22 g of 2,4-dinitrophenol, whereafter 250 ml of distilled water are added thereto. The reactor is heated to the temperature of 116° C., pressure inside the reactor is increased to 4 atm; under these conditions the process of hydrogenation is conducted under stirring for 3 hours. Then the reactor is cooled and the precipitated crystals are filtered-off to give 15.2 g of 2,4-diaminophenol. The product is recrystallized from acetone to give 10.3 g of 2,4-diaminophenol with the melting point of 80° C. The yield of 2,4-diaminophenol is 71.6% of the theoretical (i.e. as calculated for the initial 2,4-dinitrophenol).

EXAMPLE 2

The hydrogenation process is conducted in the reactor described in Example 1 hereinabove. Into the reactor (outside the chamber) there are placed 11.5 g of 2,4-dinitrophenol and then 300 ml of distilled water are added thereto. Hydrogen is continuously supplied into the chamber under the pressure of 1 atm at the rate of 10 ml/min. The reactor is heated to the temperature of 90° C. The hydrogenation is conducted under stirring for 2.5 hours. After cooling, filtration and recrystallization from acetone there are recovered 7.2 g of 2,4-diaminophenol with the melting point of 79.5° C. The yield of 2,4-diaminophenol is 92.9% as calculated for the starting 2,4-dinitrophenol.

EXAMPLE 3

Into a cylindrical reactor there are placed 20 g of 2,4-dinitrophenol poured with 40 ml of water and the resulting suspension is stirred. Then the reactor is covered with a lid whereinto a thin-wall pipe is soldered which pipe is made of an alloy consisting of 94% by mass of palladium and 6% by mass of ruthenium. The pipe has the length of 1.5 m, outside diameter 1 mm, wall thickness of 100 mcm and the area of the outer surface of 47 cm$^2$. The pipe is immersed into the starting suspension of 2,4-dinitrophenol. Hydrogen is continuously passed into the pipe (membrane catalyst) under the pressure of 20 atm at a rate of from 5 to 10 ml/min. The reactor is heated to the temperature of 150° C. and the pressure therein is increased to 60 atm. The process of hydrogenation is conducted under these conditions and stirring for 2 hours. Then the reactor is cooled, the suspension of 2,4-diaminophenol is discharged therefrom, the product is filtered-off and washed with distilled water. After recrystallization from acetone there are obtained 12.1 g of 2,4-diaminophenol. The yield of the desired product is 89.7% based on the starting 2,4-dinitrophenol.

EXAMPLE 4

The hydrogenation process is carried out in the reactor described in the foregoing Example 3; into the reactor lid a pipe is soldered-in which is made of an alloy consisting of 98% by mass of palladium and 2% by mass of ruthenium. The pipe length is 50 cm, outside diameter —1 mm, wall thickness —50 μm, the outer surface area —15 cm$^2$.

Into the reactor there are charged 20 g of 2,4-dinitrophenol and 150 ml of water to obtain a suspension. Into the pipe hydrogen is continuously fed under the pressure of 25 atm. The rate of hydrogen supply is maintained at the level similar to that specified in Example 3. The reactor is heated to the temperature of 50° C. Hydrogenation is conducted at this temperature for 8 hours. Then the temperature is lowered to room temperature, the suspension is discharged and 2,4-diaminophenol is filtered-off. The product is washed with distilled water to give 11.2 g of 2,4-diaminophenol (melting point is 78° C.) which corresponds to 83% as calculated for the starting 2,4-dinitrophenol.

EXAMPLE 5

For hydrogenation use is made of reactor consisting of two chambers separated from each other by means of a foil made of an alloy consisting of 90% by mass of palladium and 10% by mass of rhodium. The foil thickness is 100μ, the surface area —22 cm$^2$. One chamber is provided with an inlet pipe for a continuous supply of hydrogen and another outlet pipe for a continuous removal thereof. The second chamber has an inlet pipe for the continuous supply of the starting solution of 2,4-dinitrophenol in water and another outlet pipe for a continuous removal of a solution of 2,4-diaminophenol in water. The reactor is heated to the temperature of 78° C. Into one chamber hydrogen is continuously admitted under the pressure of 1 atm at the rate of 30 ml/min, while through the other a 5% aqueous solution of 2,4-dinitrophenol in water is continuously passed at the rate of 0.1 ml/min. The effluent solution of 2,4-diaminophenol is partially evaporated in vacuum and the precipitated crystals are separated. After recrystallization from acetone a product is obtained with the melting point of 81° C. The yield of 2,4-diaminophenol is 89.5% as calculated for the starting 2,4-dinitrophenol.

EXAMPLE 6

Into a cylindrical reactor there are placed 20 ml of a 30% aqueous solution of hydrochloric acid and 15 g of 2,4-dinitrophenol, whereafter the volume of the mixture is brought to 40 ml with water. The suspension of 2,4-dinitrophenol is thoroughly intermixed. Then it is hermetically sealed with a lid with soldered therein a coiled thin-wall tube made of an alloy consisting of 94% by mass of palladium and 6% by means of ruthenium. The tube length is 1.5 m, outside diameter —1 mm, wall thickness —100μ, the outer surface area —47 cm$^2$. This tube is immersed into the suspension of 2,4-dinitrophenol. Hydrogen is continuously fed into the tube under the pressure of 15 atm at the rate of 30 ml/min. The reactor is heated to the temperature of 150° C., pressure in the reactor is increased up to 40 atm. Hydrogenation is conducted at this temperature for 2 hours. Then the reactor is cooled and a colourless solution is discharged therefrom. From this solution 2,4-diaminophenol dihydrochloride is precipitated by the addition of a 37% hydrochloric acid; the product is then filtered off and washed with methanol. The yield of 2,4-diaminophenol dihydrochloride is 12.5 g which is 78% as calculated for the starting 2,4-dinitrophenol.

EXAMPLE 7

Onto the bottom of a cylindrical reactor there is placed a chamber made of a foil with the thickness of 100μ and having the working surface of 50 cm$^2$. The foil is made of an alloy consisting of 95% by mass of palladium and 5% by mass of rhodium. Hydrogen is continuously passed into the chamber under the pressure of 3 atm at the rate of 20 ml/min. Outside the chamber, into the reactor there are charged 200 ml of a 10% aqueous solution of hydrochloric acid and 10 g of 2,4-dinitrophenol. The reactor is heated to the temperature of 80° C. and the process of hydrogenation is conducted at this temperature under stirring for 1 hour. Then the reactor is cooled, the solution is discharged therefrom and 2,4-diaminophenol dihydrochloride is precipitated from the solution by the addition of a 37% hydrochloric acid. There are obtained 9.8 g of the product which corresponds to 92% as calculated for the starting 2,4-dinitrophenol.

EXAMPLE 8

Onto the bottom of a cylindrical reactor there is placed a chamber made of a foil with the thickness of 100 mcm and the working surface area of 50 cm$^2$. The foil is made of an alloy consisting of 98% by mass of palladium and 2% by mass of rhodium. Commercial hydrogen comprising a mixture of hydrogen with nitrogen (at the volume ratio therebetween of 1:1). Under the pressure of 10 atm is continuously supplied at the rate of 60 ml/min into the chamber. Outside the chamber into the reactor there are charged 300 ml of a 30% aqueous solution of hydrochloric acid and 120 g of 2,4-dinitrophenol. The reactor is heated to the temperature of 110° C. and the pressure therein is increased to 10 atm. Under these conditions the process of hydrogenation is conducted under stirring for 5 hours. After cooling and precipitation with a 37% hydrochloric acid there are obtained 116.9 g of 2,4-diaminophenol hydrochloride which corresponds to 91% based on the starting 2,4-dinitrophenol.

EXAMPLE 9

Onto the bottom of a cylindrical reactor a chamber is placed made of a foil with the thickness of 100 mcm and the working surface area of 50 cm$^2$. The foil is made of an alloy consisting of 90% by mass of palladium and 10% by mass of ruthenium. Commercial hydrogen comprising a mixture of hydrogen and argon (the volumetric ratio between the gases being 2:1 respectively) is continuously supplied into the chamber under the pressure of 32 atm at the rate of 35 ml/min. Outside the chamber into the reactor there are poured 250 ml of a 30% aqueous solution of hydrochloric acid and 2,4-dinitrophenol is added thereto in the amount of 200 g. The reactor is heated to the temperature of 105° C., the pressure inside the reactor is increased up to 10 atm. The process of hydrogenation is conducted at this temperature and under stirring for 8 hours. Then the reactor is cooled, the suspension is discharged therefrom, the unreacted 2,4-dinitrophenol is filtered-off and 2,4-diaminophenol dihydrochloride is precipitated by the addition of a 37% hydrochloric acid. The product is obtained in an amount of 160.6 g which corresponds to 75% as calculated for the starting 2,4-dinitrophenol.

EXAMPLE 10

Into a cylindrical reactor there are charged 25 g of 2,4-dinitrophenol, poured with 25 ml of water and the resulting suspension is stirred. Then the reactor is covered with a lid with soldered therein a thin-wall coiled tube made of an alloy consisting of 94% by mass of palladium and 6% by mass of ruthenium. The tube is of 3 m length with the outside diameter of 1 mm, wall thickness of 100 the outer surface area of 94 cm$^2$. It is immersed into the suspension of 2,4-dinitrophenol. Hydrogen is continuously fed into the tube under the pressure of 60 atm at the rate of 15 ml/min. The reactor is heated to the temperature of 140° C. and pressure therein is increased to 60 atm. The process of hydrogenation is conducted under these conditions for 3 hours under stirring. Then the reactor is cooled and the suspension of 2,4-diaminophenol is discharged therefrom. The product is filtered-off and washed with distilled water. After recrystallization from acetone there are isolated 15.2 g of 2,4-diaminophenol which corresponds to 89% as calculated for the initial 2,4-dinitrophenol.

EXAMPLE 11

The process of hydrogenation is conducted in the reactor described in the foregoing Example 10. Into this reactor there are charged 4 g of 2,4-dinitrophenol, poured 100 ml of water and the resulting solution is stirred. Into the tube (membrane catalyst) hydrogen is continuously fed under the pressure of 40 atm at the rate of 10 l/min. The hydrogenation is conducted at the temperature in the reactor of 100° C. for 2.5 hours. After cooling the solution is partially evaporated in vacuum and the precipitated crystals of 2,4-diaminophenol are separated. After recrystallization from acetone there are obtained 2.8 g of 2,4-diaminophenol with the melting point of 79° C. The product yield is 91.5% based on the starting 2,4-dinitrophenol.

EXAMPLE 12

Into the reactor described in the foregoing Example 7 there are charged 200 ml of a 4% aqueous solution of hydrochloric acid and 4 g of 2,4-dinitrophenol are added thereto. Hydrogen is continuously introduced inside the chamber under the pressure of 1 atm at the rate of 15 ml/min. The reactor is heated to the temperature of 50° C. and hydrogenation is conducted at this temperature for 1.5 hours. After cooling and precipitation with a 37% hydrochloric acid there are obtained 3.9 g of 2,4-diaminophenol dihydrochloride which corresponds to 91.5% as calculated for the starting 2,4-dinitrophenol.

EXAMPLE 13

Into the reactor described in Example 6 there are placed 30 g of 2,4-dinitrophenol and 30 ml of a 37% aqueous solution of hydrochloric acid. The resulting suspension is thoroughly intermixed. The reactor is then hermetically closed with a cover, whereinto a thin-wall coiled tube is soldered. Hydrogen is continuously admitted into the tube under the pressure of 60 atm at the rate of 25 ml/min. The reactor is heated to the temperature of 150° C. and pressure therein over the suspension is increased to 60 atm. Under these conditions hydrogenation is carried out for 4 hours. After cooling and precipitation with a 37% hydrochloric acid the resulting product is filtered-off and washed with methanol to give 24 g of 2,4-diaminophenol which corresponds to 77% as calculated for the starting 2,4-dinitrophenol.

What is claimed is:

1. A method for preparing phenol diamino derivatives selected from the group consisting of 2,4-diaminophenol and 2,4-diaminophenol dihydrochloride comprising hydrogenation of 2,4-dinitrophenol on a membrane catalyst made of an alloy consisting of 90 to 98% by mass of palladium and 2 to 10% by mass of a metal selected from the group consisting of rhodium and ruthenium; said hydrogenation of 2,4-dinitrophenol is effected by hydrogen diffusing through said membrane catalyst; the starting 2,4-dinitrophenol is used in a medium of a polar solvent selected from the group consisting of water and a 4–37% aqueous solution of hydrochloric acid at a concentration of 2,4-dinitrophenol in said medium ranging from 2 to 50% by mass; said hydrogenation being conducted at a temperature within the range of from 50° to 150° C. under a pressure of from 1 to 60 atm.

* * * * *